(12) United States Patent
Leach et al.

(10) Patent No.: US 8,819,814 B1
(45) Date of Patent: Aug. 26, 2014

(54) SECURE ACCESS INFRASTRUCTURE

(75) Inventors: Linda Karen Leach, San Antonio, TX (US); Kristopher Lee Koehler, New Braunfels, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1572 days.

(21) Appl. No.: 11/735,034

(22) Filed: Apr. 13, 2007

(51) Int. Cl.
*G06F 15/16* (2006.01)
*H04L 29/06* (2006.01)
*G06F 21/12* (2013.01)

(52) U.S. Cl.
CPC .............. *H04L 63/08* (2013.01); *H04L 63/101* (2013.01); *G06F 21/121* (2013.01)
USPC ............ 726/21; 726/4; 726/6; 726/7; 726/29; 709/202; 709/203; 709/225

(58) Field of Classification Search
CPC ... H04L 63/101; H04L 63/08; G06F 21/6218; G06F 2221/1241; G06F 21/121; H04W 12/08
USPC .......... 713/186, 182–185; 711/108; 380/281; 709/202, 203, 225, 226; 726/3–7, 726/20–29
See application file for complete search history.

(56) References Cited

U.S. PATENT DOCUMENTS

| | | | |
|---|---|---|---|
| 5,235,642 A * | 8/1993 | Wobber et al. ................ | 713/156 |
| 5,770,843 A * | 6/1998 | Rose et al. .................... | 235/380 |
| 5,941,947 A * | 8/1999 | Brown et al. ................. | 709/225 |
| 6,088,451 A * | 7/2000 | He et al. ............................. | 726/8 |
| 6,144,959 A * | 11/2000 | Anderson et al. ..................... | 1/1 |
| 6,460,141 B1 * | 10/2002 | Olden ................................. | 726/4 |
| 7,233,927 B1 * | 6/2007 | Norton et al. .................... | 705/67 |
| 7,703,667 B2 * | 4/2010 | Koorland et al. ............. | 235/375 |
| 7,783,891 B2 * | 8/2010 | Perlin et al. .................... | 713/183 |
| 7,797,727 B1 * | 9/2010 | Miller et al. ....................... | 726/1 |
| 7,904,949 B2 * | 3/2011 | Bowers et al. ................... | 726/10 |
| 8,046,823 B1 * | 10/2011 | Begen et al. ....................... | 726/3 |
| 8,132,242 B1 * | 3/2012 | Wu .................................. | 726/8 |
| 8,171,287 B2 * | 5/2012 | Villela ........................... | 713/168 |
| 8,341,616 B2 * | 12/2012 | Kadashevich ................ | 717/168 |
| 2002/0071565 A1 * | 6/2002 | Kurn et al. ..................... | 380/281 |
| 2003/0056095 A1 * | 3/2003 | Elliott et al. .................. | 713/164 |
| 2004/0054916 A1 * | 3/2004 | Foster et al. .................. | 713/200 |

(Continued)

OTHER PUBLICATIONS

Access Control Mechanisms and Algorithms, Java Security Architecture, [online], [retrieved from the internet on Apr. 9, 2007 using <URL: http://java.sun.coom/j2se/1.3/docs/guide/security/spec/security-spec.doc4.html>.

(Continued)

*Primary Examiner* — Catherine Thiaw
(74) *Attorney, Agent, or Firm* — Ungaretti & Harris LLP

(57) ABSTRACT

Method and system are disclosed for limiting use of a service account to only applications that have been authorized. The method and system provide a service account security infrastructure for verifying the identity of an application requesting credentials from a service account and for checking that the application is authorized to use the service account. The infrastructure also allows service account owners and security personnel to manage service accounts, including establishing a secure identity for each application and granting authorization to the application to use a service account.

19 Claims, 7 Drawing Sheets

(56) References Cited

U.S. PATENT DOCUMENTS

| | | |
|---|---|---|
| 2004/0187029 A1* | 9/2004 | Ting .............................. 713/201 |
| 2004/0193906 A1* | 9/2004 | Dar et al. ...................... 713/200 |
| 2004/0243640 A1* | 12/2004 | Bostleman et al. ........ 707/104.1 |
| 2005/0010574 A1* | 1/2005 | Vaught ............................ 707/10 |
| 2006/0075475 A1* | 4/2006 | Boulos et al. ..................... 726/6 |
| 2006/0089914 A1* | 4/2006 | Shiel et al. ....................... 705/52 |
| 2006/0101196 A1* | 5/2006 | Urmston et al. ............. 711/108 |
| 2006/0143127 A1* | 6/2006 | Allard et al. .................... 705/51 |
| 2006/0161783 A1* | 7/2006 | Aiken et al. .................. 713/182 |
| 2006/0174131 A1* | 8/2006 | Prager .......................... 713/182 |
| 2006/0242067 A1* | 10/2006 | Jogand-Coulomb et al. ... 705/50 |
| 2006/0265760 A1* | 11/2006 | Daemke et al. ................ 726/27 |
| 2006/0294578 A1* | 12/2006 | Burke et al. ...................... 726/2 |
| 2007/0016630 A1* | 1/2007 | Samji et al. .................... 707/204 |
| 2007/0101400 A1* | 5/2007 | Freeman et al. ................. 726/2 |
| 2007/0101440 A1* | 5/2007 | Bhatia et al. .................... 726/28 |
| 2007/0118756 A2* | 5/2007 | Oliphant ....................... 713/182 |
| 2007/0186112 A1* | 8/2007 | Perlin et al. .................... 713/182 |
| 2007/0192484 A1* | 8/2007 | Yamaoka et al. ............. 709/225 |
| 2007/0192499 A1* | 8/2007 | Chiczewski et al. .......... 709/229 |
| 2007/0220154 A1* | 9/2007 | El Husseini et al. .......... 709/227 |
| 2007/0234062 A1* | 10/2007 | Friedline ...................... 713/183 |
| 2008/0104207 A1* | 5/2008 | Pulkkinen et al. ............. 709/220 |
| 2008/0127296 A1* | 5/2008 | Carroll et al. ..................... 726/1 |
| 2008/0134295 A1* | 6/2008 | Bailey et al. ...................... 726/4 |
| 2008/0134343 A1* | 6/2008 | Pennington et al. ........... 726/28 |
| 2008/0184349 A1* | 7/2008 | Ting .................................. 726/7 |
| 2008/0201767 A1* | 8/2008 | Williams et al. .................. 726/6 |

OTHER PUBLICATIONS webMethods datasheet, webMethods Infravio X-Broker, [online], [retrieved from the internet on Apr. 9, 2007 using <URL: http://www1.webmethods_com/PDF/datasheets/Infravio_X-Broker_Datasheet.pdf>.

Thread-local storage, [online], [retrieved from Wikipedia on the internet on Apr. 9, 2007 using <URL: http://en.wikipedia.org/wiki/Thread-local_storage>.

* cited by examiner

SECURE ACCESS INFRASTRUCTURE

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to security controls surrounding access to sensitive data and information. In particular, the disclosed embodiments relate to methods and systems for controlling access to service accounts that may be used conduct transactions on such data and information.

BACKGROUND

The term "service account" generally refers to the credentials used by an enterprise application server, such as WebSphere Application Server from IBM Corp., to connect enterprise applications to a given enterprise resource (e.g., a database, a service, an external system, etc.). The service account allows the enterprise applications to access the resource, for example, to retrieve information, conduct various transactions (e.g., funds transfers, etc.), and the like. As with most enterprises, the resource often contains highly sensitive data, such as personnel information, financial information, medical information, and the like. Consequently, each service account typically has one or more credentials associated therewith, usually a user identification (ID) and a password, that are required in order to access the resource.

FIG. 1 illustrates an example of the above arrangement. As can be seen, a plurality of service accounts 100a, 100b, and 100c are stored in a directory 102, typically a searchable Lightweight Directory Access Protocol (LDAP) directory. To be more precise, one or more credentials associated with each service account 100a-c are stored in the searchable directory 102. These credentials, shown in FIG. 1 as 1, Credentials 2, and Credentials 3, typically include an ID, a password, and/or other similar access controls that are changed on a regular basis for security reasons. The credentials may then be used to access (i.e., read, write, etc.) various resources 104a, 104b, or 104c linked to the service accounts 100a-c.

In operation, enterprise applications 106a, 106b, and 106c needing access to one of the resources 104a-c may request the credentials for that resource 104a-c. Such enterprise applications 106a-c may include, for example, banking applications, human resource applications, inventory control applications, and the like. In some arrangements, the request from the applications 106a-c may include an alias for the desired service account 100a-c rather than the actual name of the service account 100a-c so as to avoid updating the various applications 106a-c every time the name of a service account 100a-c changes. Upon receiving the alias, the directory 102 finds the corresponding service account 100a-c and returns the credentials therefor to the requesting application 106a-c. The requesting application 106a-c may thereafter use the credentials to access the resource 104a-c in a manner known to those having ordinary skill in the art.

In the above arrangement, applications 106a-c are only supposed to use credentials from service accounts 100a-c for which they are authorized. In practice, however, almost any application 106a-c may use credentials from almost any service account 100a-c as long as the application 106a-c has (or is able to obtain) the alias for that service account 100a-c. This is because the identity of the requesting application 106a-c is not usually provided to the service accounts 100a-c in an enterprise application server environment. As a result, it is difficult to prevent an application 106a-c from using a service account 100a-c to gain unauthorized access to a given resource 104a-c.

Accordingly, what is needed is a more secure way to limit use of service accounts to applications that have been specifically authorized to use the service accounts. In particular, what is needed is a way to establish an identity for each application and to use that identity to restrict use of the service accounts only to applications that have been authorized.

SUMMARY

The disclosed embodiments are directed to a method and a system for limiting use of a service account to only applications that have been authorized. The method and system provide a service account security infrastructure for verifying the identity of an application requesting credentials for a service account and for checking that the application is authorized to use the service account. The infrastructure also allows service account owners and security personnel to manage service accounts, including establishing a secure identity for each application and granting authorization to the application to use a service account.

In general, in one aspect, the disclosed embodiments are directed to a method of restricting use of service accounts, each service account allowing access to a respective resource within an enterprise. The method comprises receiving a request from an application to use a service account, the request including an identification for the application. The method further comprises determining whether the application is authorized to use the service account based on the identification. The method finally comprises connecting the application to an appropriate resource in response to determining that the application is authorized to use the service account.

In general, in another aspect, the disclosed embodiments are directed to a system for restricting use of service accounts, each service account allowing access to a respective resource within an enterprise. The system comprises at least one subsystem configured to receive a request from an application to use a service account, the request including an identification for the application. The system further comprises at least one subsystem configured to determine whether the application is authorized to use the service account based on the identification. The system finally comprises at least one subsystem configured to connect the application to an appropriate resource in response to determining that the application is authorized to use the service account.

In general, in yet another aspect, the disclosed embodiments are directed to a computer-readable medium encoded with instructions for restricting use of service accounts, each service account allowing access to a respective resource within an enterprise. The computer-readable instructions comprise instructions for receiving a request from an application to use a service account, the request including an identification for the application. The computer-readable instructions further comprise instructions for determining whether the application is authorized to use the service account based on the identification. The computer-readable instructions finally comprise instructions for connecting the application to an appropriate resource in response to determining that the application is authorized to use the service account.

BRIEF DESCRIPTION OF THE DRAWINGS

The foregoing and other advantages of the invention will become apparent from the following detailed description and upon reference to the drawings, wherein.

DETAILED DESCRIPTION

Following is a detailed description of illustrative embodiments with reference to the drawings wherein the same reference labels are used for the same or similar elements. Throughout this description and the claims, the terms "a" and "an" are intended to mean "one or more."

As mentioned previously, existing solutions do not typically provide the identity of an enterprise application requesting use of a service account. As a result, almost any enterprise application may use almost any service account provided the application has (or is able to obtain) an approved aliases for that service account. The disclosed embodiments provide a method and a system for limiting use of a service account to only applications that have been authorized. The method and system provide a service account security infrastructure for allowing the identity of applications requesting credentials from service accounts to be verified and for checking that these applications are authorized to use the service accounts. The infrastructure also allows service account owners and security personnel to manage service accounts, including establishing a secure identity for various applications and granting authorization to the applications to use the service account. Such an infrastructure helps protect service accounts from being abused or misused, thereby assuring companies and enterprises that their resources are being used in an appropriate manner.

Figure 2:
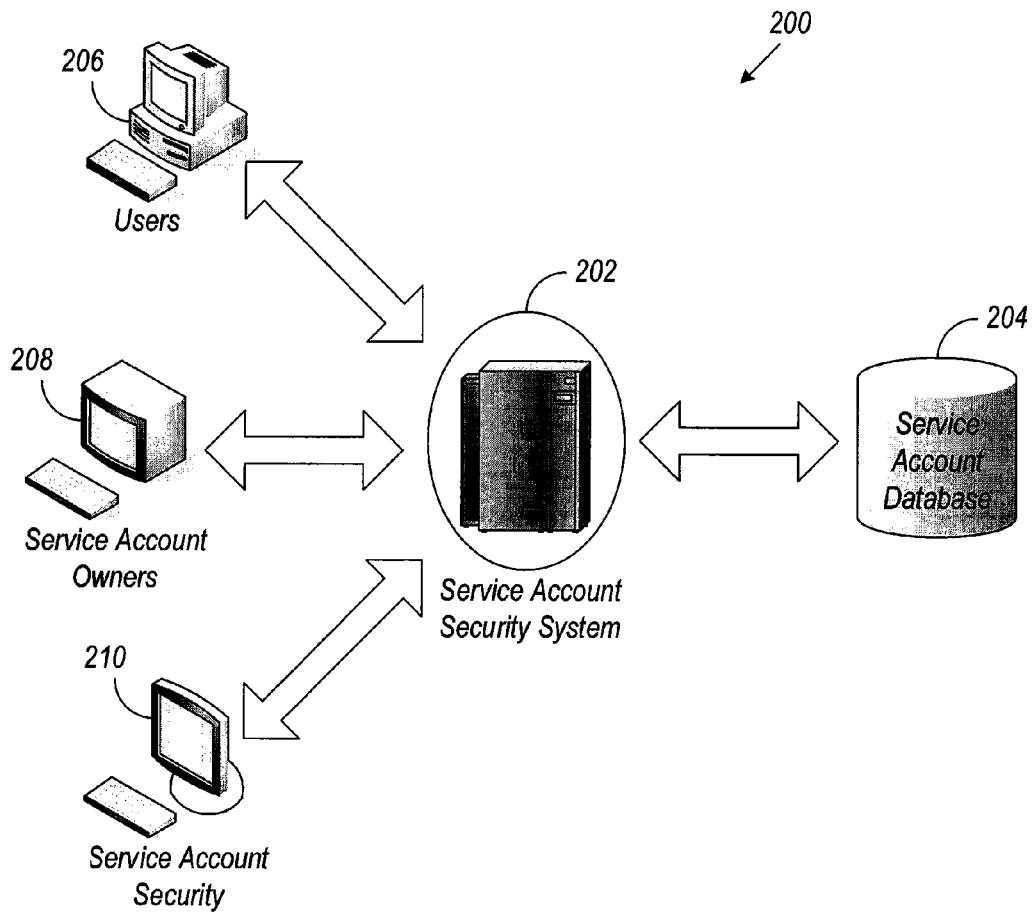
FIG. 2 illustrates an exemplary arrangement for restricting use of service accounts according to the disclosed embodiments.

Referring now to FIG. 2, an exemplary network 200 for restricting an application's use of service accounts according to the disclosed embodiments is illustrated. The network 200 may be any suitable network known to those having ordinary skill in the art, including a local area network (LAN), a wide area network (WAN), a private network (intranet), a public network (the Internet), and various combinations thereof. As can be seen, the network 200 includes a service account security system 202 connected to a service account database 204 containing credentials for various service accounts. The service account security system 202 controls access to the service account database 204 and the service account credentials therein. Enterprise users 206, through various enterprise applications on the network 200, may then request credentials for the service accounts in the service account database 204 via the service account security system 202. In a similar manner, service account owners 208, service account security personnel 210, and other authorized persons may manage the various service accounts in the service account database 204 through the service account security system 202.

Figure 3:
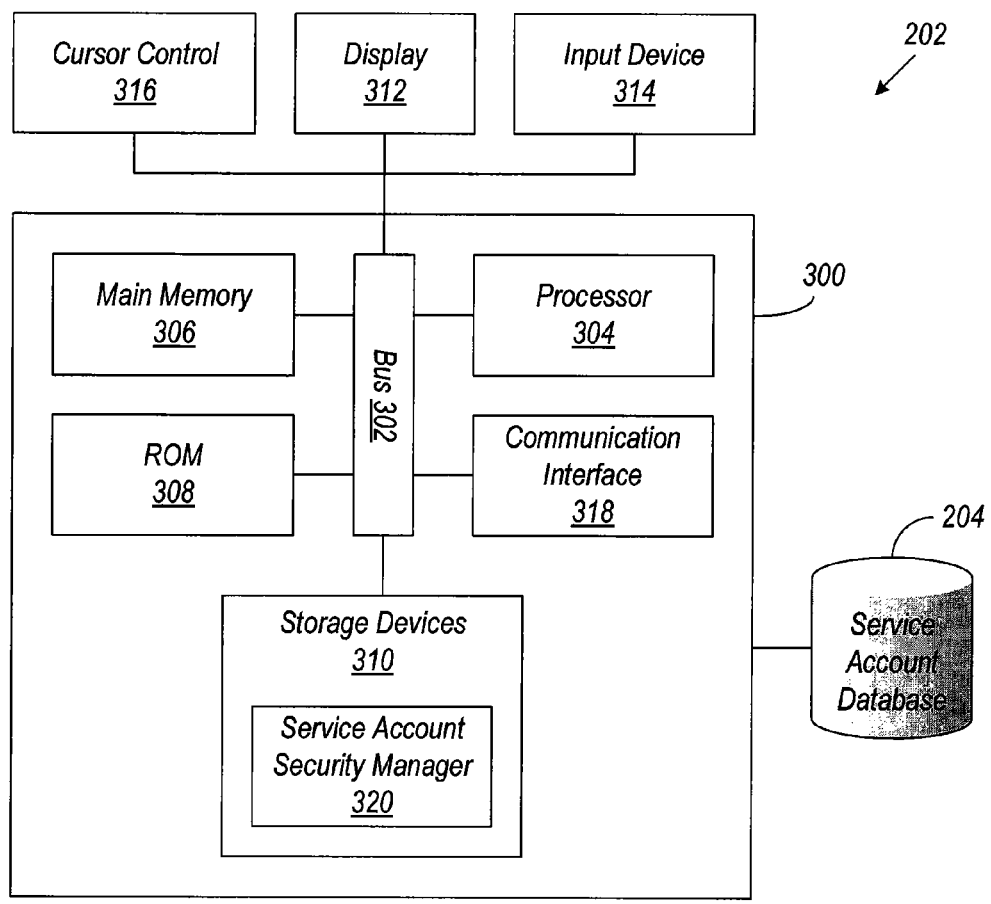
FIG. 3 illustrates an exemplary system for hosting a service account security manager according to the disclosed embodiments.

FIG. 3 illustrates the exemplary service account security system 202 in more detail according to the disclosed embodiments. As can be seen, in one embodiment, the service account security system 202 may include at least one server 300. Any suitable server 300 known to those having ordinary skill in the art may be used as part of the service account security system 202, including a workstation, a Web server, a main frame, and the like. Such a server 300 typically includes a bus 302 or other communication mechanism for communicating information and a processor 304 coupled with the bus 302 for processing information. The server 300 may also include a main memory 306, such as a random access memory (RAM) or other dynamic storage device, coupled to the bus 302 for storing computer-readable instructions to be executed by the processor 304. The main memory 306 may also be used for storing temporary variables or other intermediate information during execution of the instructions to be executed by the processor 304. The server 300 may further include a read-only memory (ROM) 308 or other static storage device coupled to the bus 302 for storing static information and instructions for the processor 304. A computer-readable storage device 310, such as a magnetic disk or optical disk, may be coupled to the bus 302 for storing information and instructions for the processor 304.

The server 300 may be coupled via the bus 302 to a display 312, such as a cathode ray tube (CRT), for displaying information to a user. An input device 314, including, for example, alphanumeric and other keys, may be coupled to the bus 302 for communicating information and command selections to the processor 304. Another type of user input device may be a cursor control 316, such as a mouse, a trackball, or cursor-direction keys for communicating direction information and command selections to the processor 304, and for controlling cursor movement on the display 312. The cursor control 316 typically has two degrees of freedom in two axes, a first axis (e.g., X-axis) and a second axis (e.g., Y-axis), that allow the device to specify positions in a plane.

The term "computer-readable instructions" as used above refers to any instructions that may be performed by the processor 304 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 310. Volatile media may include dynamic memory, such as main memory 306. Transmission media may include coaxial cables, copper wire and fiber optics, including wires of the bus 302. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 304 for execution. For example, the instructions may initially be borne on a magnetic disk of a remote computer. The remote computer can load the instructions into its dynamic memory and send the instructions over a telephone line using a modem. A modem local to the service account security system 202 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received by the main memory 306 may optionally be stored on the storage device 310 either before or after execution by the processor 304.

The server 300 may also include a communication interface 318 coupled to the bus 302. The communication interface 318 typically provides a two-way data communication coupling between the server 300 and the network 106. For example, the communication interface 318 may be an integrated services digital network (ISDN) card or a modem used to provide a data communication connection to a corresponding type of telephone line. As another example, the communication interface 318 may be a local area network (LAN) card used to provide a data communication connection to a compatible LAN. Wireless links may also be implemented. Regardless of the specific implementation, the main function of the communication interface 318 is to send and receive electrical, electromagnetic, optical, or other signals that carry digital data streams representing various types of information.

In accordance with the disclosed embodiments, a service account security manager 320, or rather the computer-readable instructions therefor, may also reside on the storage device 310. The computer-readable instructions for the service account security manager 320 may then be executed by the processor 304 and/or other components of the server 300 to restrict use of service accounts in the service account database 204 to only applications that have been authorized. In some embodiments, the service account security manager 320 restricts the use of these service accounts by verifying the identity of applications requesting service account credentials, then checking that the applications are authorized to use the service accounts. The service account security manager 320 also allows service account owners and security personnel to manage the service accounts, for example, by establishing a secure identity for new applications and granting authorization to such new applications.

Following is a description of exemplary implementations of the service account security manager 320 according to the disclosed embodiments. The particular exemplary implementations described here are based on an enterprise application server environment in which the enterprise applications are Java-based applications (e.g., WebSphere Application Server, Java 2 Security, etc.). Such an environment may include, for example, Java Permission classes, Java PrivilegedAction classes, a Java Policy file (to store granted permissions), and a Java ThreadLocal variable. As will be seen, the exemplary implementations have a distinct advantage in that they do not involve changing method signatures and references to those signatures for classes in the application call stack. It is possible, however, for the service account security manager 320 to be implemented in other environments that use alternative programming languages, such as Windows or Unix and C or C++, without departing from the scope of the disclosed embodiments. These alternative environments could implement the concepts and principles taught herein using, for example, checksums, call paths, call stacks, and the like.

Figure 4:
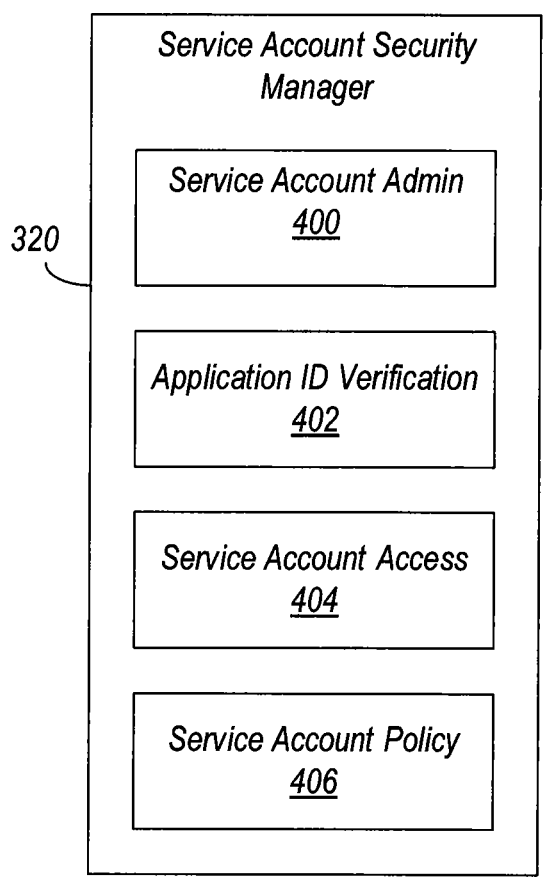
FIG. 4 illustrates an exemplary service account security manager according to the disclosed embodiments.

Referring now to FIG. 4, the service account security manager 320 in one exemplary implementation has a number of functional components, including a service account administration component 400, an application ID verification component 402, a service account credential retrieval component 404, and a secure application identity policy component 406. It should be noted that while several discrete components 400-406 are shown in FIG. 4, those having ordinary skill in the art will understand that one or more of these functional components may be combined into a single component and that any individual component may be divided into several constituent components as needed without departing from the scope of the disclosed embodiments. Following is a more detailed description of the various functional components 400-406 of the service account security manager 320.

The service account administration component 400 allows service account owners, service account security personnel, and similar persons to manage the different service accounts. For example, depending on how responsibility for various tasks is allocated within a company or enterprise, the service account administration component 400 may let or may entail letting some or all of these persons create new service accounts (both secured and unsecured) in the service account database 204 (see FIG. 2), replace existing service accounts as needed, process new requests for authorization to use a service account (typically from application developers), remove an existing authorization to use a service account, and change credentials for a service account as needed in the service account database 204. Other functionality connected with the service account administration component 400 may include removing "open access" to any service account and viewing the last service request date and time for any service account.

To facilitate processing of new requests for authorization, the service account administration component 400 may provide or may entail providing a graphical user interface for the service account owners and the service account security personnel. The specific design and layout of the graphical user interface is not particularly important, but preferably the interface allows the service owners and service account security personnel to search for specific service accounts and also includes fields for entering certain items of information that are needed from the application developers. Such information may include, for example, either a developer-provided or security personnel-provided ID for the application and the unique code base or file system path for the application. For most Java applications, the code base is the specific URL from which the application or Java class is loaded. Other information that may be provided by the application developers include the release date of the application and the reason the application needs access to the resource associated with the service account.

Assuming the authorization requested by the application may be granted (e.g., by the service account owner, service account security personnel, etc.), the information provided by the application developers is stored in the secure application identity policy component 406 (e.g., via the graphical user interface). The information in the secure application identity policy component 406 (which may be a file) may then be accessed by the service account administration component 400 (as well as the application ID verification component 402 and service account credential retrieval component 404) as needed. More specifically, the service account administration component 400 may map or may entail mapping the ID of the application to the code base for the application in the service account policy file 406. Such mapping may be accomplished, for example, using a lookup table, a list, or any other suitable data structure known to those having ordinary skill in the art. Notes related to the mapping (e.g., who requested it, when it was requested, why it was requested, etc.) may also be stored in the service account policy file 406 as needed.

The use of a graphical user interface makes possible a number of time-saving features. For example, it allows population of drop-down selections of application IDs and service accounts from which service account owners and service account security personnel may choose in order to grant authorization for applications to use service accounts. In addition, it is not necessary for the personnel entering the various items of information to know the particular format of the mappings and authorization grants in the service account policy file 406. It is nevertheless possible for the items of information to be manually entered into the service account policy file 406 provided the personnel performing the manual entry are familiar with the mapping and authorization grant formats. In either case, whenever an application subsequently makes a request for credentials from a particular service account, the ID and code base of the requesting application may be compared to the ID and code base stored in the service account policy file 406 in order to verify the identity of the application.

Verification of the application identity is the primary function of the application ID verification component 402. This verification is required for all applications that wish to use a secure service account (i.e., one that does not allow open access). In one exemplary implementation, the application ID verification component 402 may perform or may entail performing the ID verification by invoking a first Java PrivilegedAction class, for example, AppIdPrivilegedAction, and passing to it the ID received from the requesting application. In accordance with the disclosed embodiments, the invoked AppIdPrivilegedAction class is designed to check that the requesting application has the necessary permission (found in the secure application identity policy component 406) to represent itself as the passed application ID. Performing such a permission check is well known to those having ordinary skill in the art and need not be described in detail here. A successful permission check means that the ID presented by the requesting application truly belongs to that application (i.e., the application ID is verified).

Once the ID of the requesting application has been verified, the AppIdPrivilegedAction class is designed to provide the ID to the service account access component 404. In general, the service account access component 404 is responsible for restricting usage of service accounts only to authorized applications. Thus, the service account access component 404 may check or may entail checking whether a requesting application is authorized to use a requested service account and, if so, cause the service account credentials and configuration information for the requested service account to be retrieved from the service account database 204. The service account access component 404 may also encrypt/decrypt service account passwords or other credentials in some implementations as well as caching retrieved credentials in order to expedite subsequent requests.

In accordance with the disclosed embodiments, the service account access component 404 may check or may entail checking whether a requesting application is authorized to use a requested service account by invoking a second Java PrivilegedAction class, for example, SecureAccessContext). The SecureAccessContext class is designed to set the ID of the calling application on a Java ThreadLocal variable. The use of the ThreadLocal variable is multi-purpose in that it allows the method signatures and references to those signatures in the calling applications in a call stack to remain the same and also holds the application ID, which is what securely identifies the application. The Java ThreadLocal variable may then be used by subsequent Java classes in the call stack to retrieve the credentials for the requested service account. When any code on the thread of execution requests a service account, the application ID will be available to the service account security manager 320.

In some implementations, a set of accessor classes, a data access object (DAO) class, and other Java utility classes (not expressly shown) may be provided to handle connecting to and performing various tasks on the service account database 204. These Java methods are designed to check for the existence of a grant on any class attempting to call these methods. In accordance with the disclosed embodiments, this grant will only be given to the service account administration component 400 and the service account access component 404.

Figure 5:
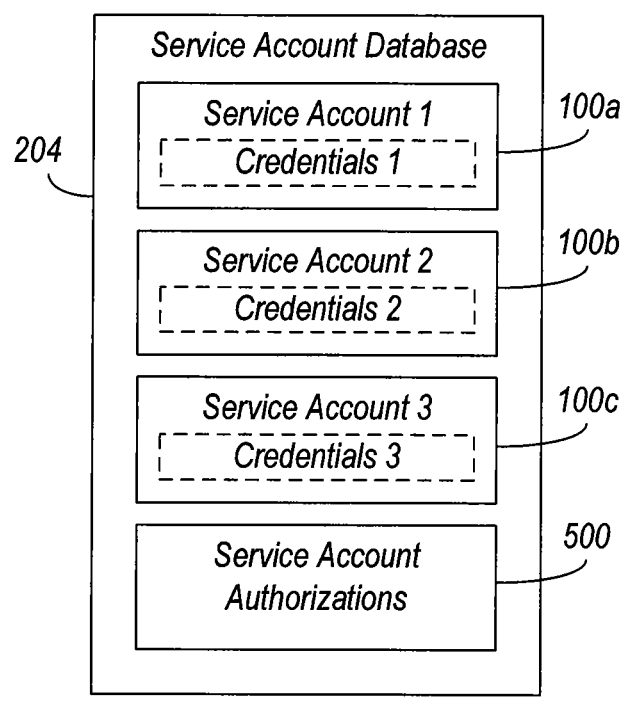
FIG. 5 illustrates an exemplary service account database according to the disclosed embodiments.

Referring now to FIG. 5, an exemplary implementation of the service account database 204 is shown. The service account database 204 is preferably a relational database, for example, a Universal Database (UDB) from IBM Corp., although any suitable database known to those having ordinary skill in the art may be used (including an LDAP database). Such a service account database 204, or rather one or more servers therefor (see FIG. 3), may be located in a physically secure location and placed behind a firewall so that only authorized IP addresses can connect to the servers.

Figure 1:
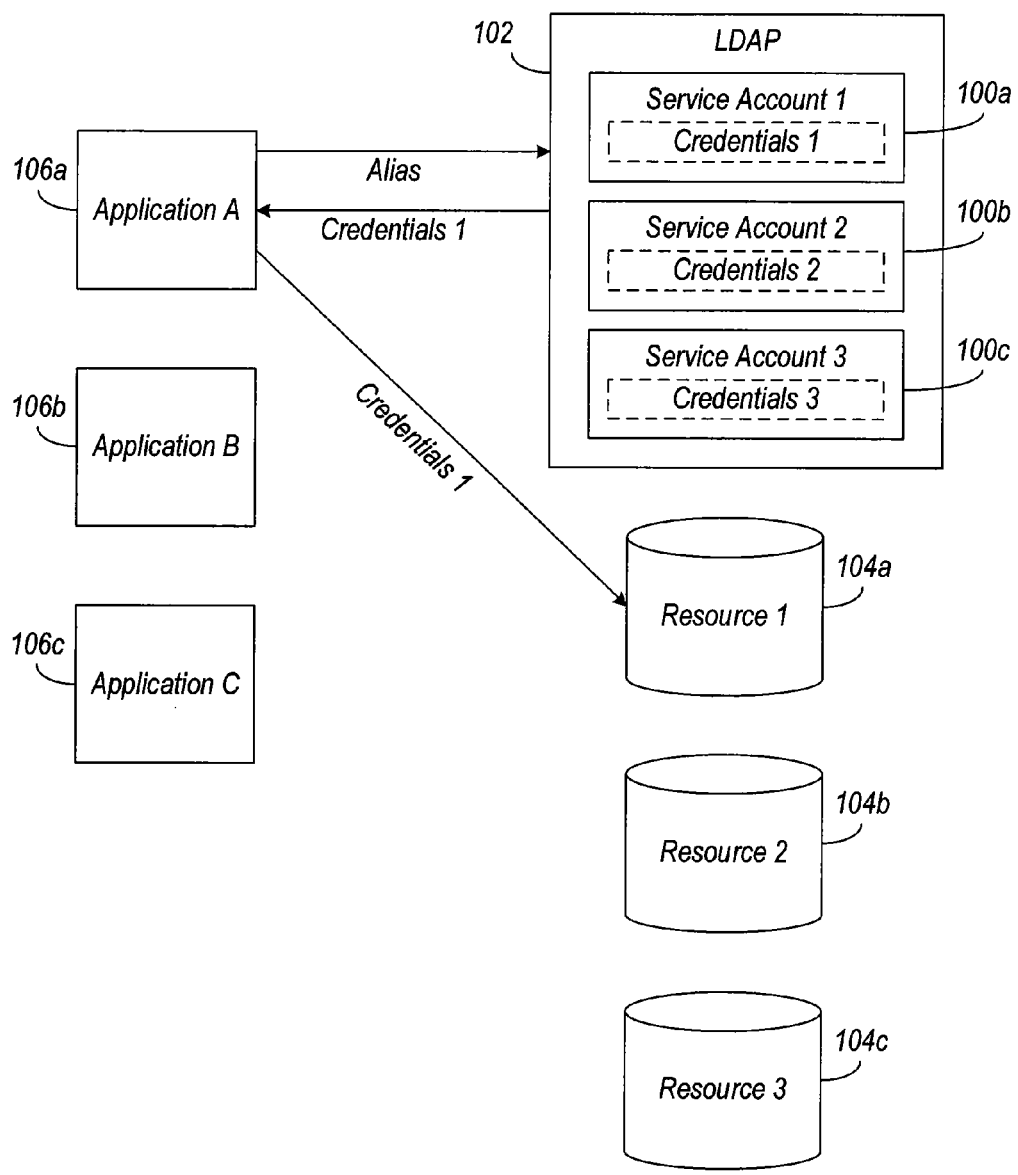
FIG. 1, described previously, illustrates an example of a prior art arrangement for restricting use of service accounts.

As can be seen, the service account database 204 is similar to the directory 102 (see FIG. 1) in that it contains a plurality of service accounts 100a-c and the credentials therefor. These credentials may include, for example, IDs, passwords (which may be encrypted), and other security controls, as well as any configuration information needed for the service accounts. In addition to the various service accounts 100a-c, the service account database 204 may also contain the authorizations 500 for the various service accounts 100a-c. In some implementations, the service accounts 100a-c and the authorizations 500 may reside in at least two tables: one listing the service account credentials and associated configuration information, and another one listing applications that have been authorized to use the service accounts.

Tables 1 and 2 below illustrate exemplary listings of the service accounts 100a-c and the authorizations 500, respectively, where each table includes a list of service accounts and aliases as well as the date and time (i.e., a timestamp) of the most recent service request made on the service account. This date and time may be updated for each service account whenever an application requests the credentials for the service account or whenever an update is made to the service account. Table 1 additionally contains the credentials for each service account, including the identification, password, and any configuration information (not expressly shown). These credentials may be changed on a regular or irregular basis in accordance with any applicable security policies and procedures of the company or enterprise. Also included is an entry for indicating whether or not the service account is a secure service account, meaning that it can only be accessed by authorized applications. Table 2, on the other hand, contains a listing of IDs for applications that are approved to use each service account.

TABLE 1

Credentials

| Service Account | Alias | ID | Password | Secured | Last Request |
|---|---|---|---|---|---|
| 1 | Fund Transfer | ID 1 | Password 1 | Yes | Mar. 21, 2007 9:45 pm |
| 2 | Payroll Tax | ID 2 | Password 2 | Yes | Mar. 12, 2007 5:30 pm |
| 3 | Product Order | ID 3 | Password 3 | No | Feb. 16, 2007 9:15 am |
| ... | ... | ... | ... | ... | ... |

TABLE 2

Approved Applications

| Service Account | Alias | Approved Application ID | Last Request |
|---|---|---|---|
| 1 | Fund Transfer | Bank ID | Mar. 21, 2007 9:45 pm |
| 2 | Payroll Tax | Logon ID | Mar. 12, 2007 5:30 pm |
| 3 | Product Order | Sales ID | Feb. 16, 2007 9:15 am |
| ... | ... | ... | ... |

Figure 6:
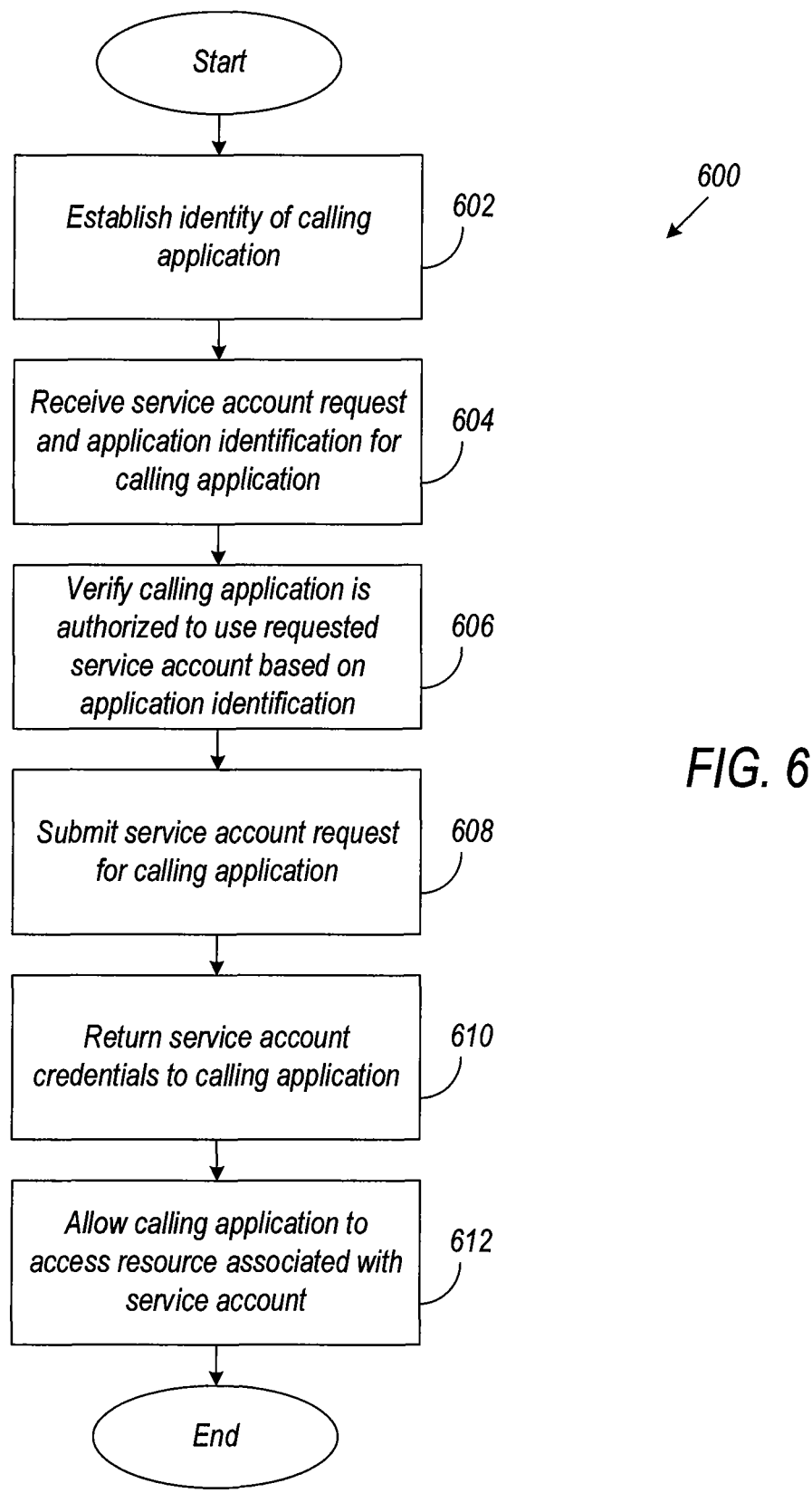
FIG. 6 illustrates an exemplary method for restricting use of service accounts according to the disclosed embodiments.
Figure 7:
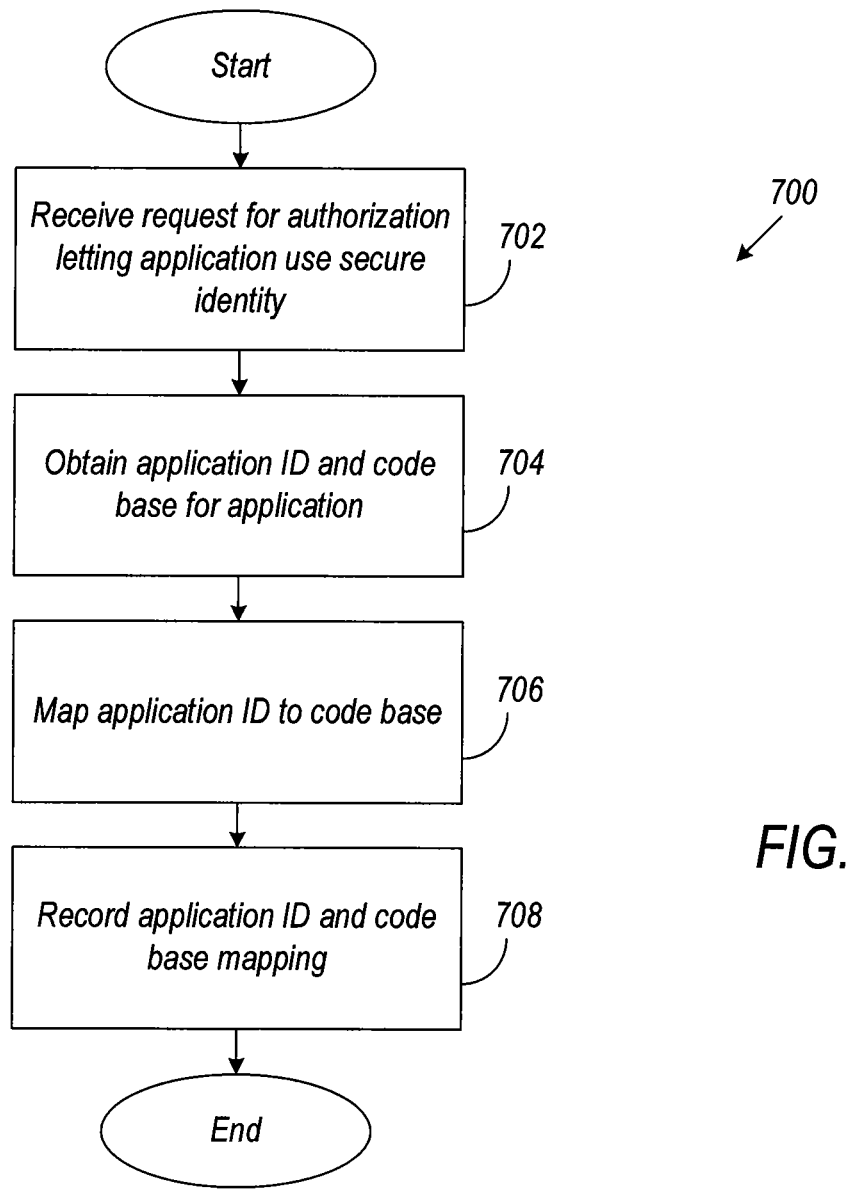
FIG. 7 illustrates an exemplary method for managing service accounts according to the disclosed embodiments.

Thus far, the disclosed embodiments have been described with respect to a number of software and hardware components. Following are general methods that may be implemented in connection with the disclosed embodiments, as described with respect to FIGS. 6-7. It should be noted that although several discrete steps are shown in FIGS. 6-7, those having ordinary skill in the art will understand that one or more of these steps may be combined into a single step and that any individual step may be divided into several constituent steps as needed without departing from the scope of the disclosed embodiments. Moreover, although the steps in FIGS. 6-7 are arranged in a particular sequence, those having ordinary skill in the art will recognize that one or more of the steps may be performed outside the order shown without departing from the scope of the disclosed embodiments.

Referring now to FIG. 6, an exemplary method 600 of retrieving credentials from a service account according to the disclosed embodiments is shown. The method 600 begins at step 602 where an application ID received from a calling application is established or verified by comparing the code base for the calling application to the code base previously mapped to application ID in the manner described above with respect to FIG. 4. If there is a match (meaning that the ID for the application is confirmed), then at step 604, a service account request is received along with the application ID from the calling application. At step 606, authorization for the calling application to use the service account is verified, again, in the manner described above with respect to FIG. 4. If authorization exists, a service account requests is submitted for the calling application at step 608, and the credentials for the service account is returned to the calling application at step 610. At step 612, the calling application is allowed to access the resource connected to the service account.

FIG. 7 illustrates an exemplary method 700 of establishing an ID for an application according to the disclosed embodiments. The method 700 begins at step 702 where a request for a secure application ID is made, thereby letting an application use a secure identity. Such a request may be made for any reason (or even no reason) where it is necessary to know exactly which application is making an application call, including to allow the application to use a service account, for chargeback purposes, and the like. At step 704, the application ID and code base for the application requesting authorization to use the service account are obtained from the application developer, for example, via a graphical user interface. At step 706, the ID for the application is mapped to the code base for the application, and the mapping is stored (e.g., in a policy file) at step 708 in a manner similar to that described above.

In embodiments where the application is requesting permission to use a service account, a determination may made at this time by the service account owner and/or service account security personnel as to whether the authorization may be granted to the application. If it is determined that authorization may be granted, then the authorization grant may also be stored in the policy file at this time along with the code base mapping, and these items of information may subsequently be used to restrict use of the service account in the manner described above.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which is set forth in the following claims.

What is claimed is:

1. A non-transitory computer-readable medium having instructions for restricting use of service accounts, each service account allowing access to a respective resource within an enterprise, said computer-readable instructions comprising instructions for:

receiving a request from an application to use a service account of a plurality of service accounts each including a number of resource credentials, said resource credentials including a service account identification, configuration information needed for the service account, and a resource password, said request including an identification for said application;

determining, in response to receiving the request, whether said application is authorized to use said service account of the plurality of service accounts based on said identification for said application, wherein determining includes referencing:

a first database table including the plurality of service accounts and a respective number of resource credentials associated therewith, wherein said plurality of service accounts includes said service account; and a second database table including applications that have been authorized to use at least one service account of said plurality of service accounts;

retrieving the number of resource credentials associated with said service account of the plurality of service accounts in response to determining that said application is authorized to use said service account of the plurality of service accounts;

connecting, utilizing the retrieved number of resource credentials associated with said service account, said application to an appropriate resource;

caching one or more of the retrieved number of resource credentials of said service account; and allowing service account owners and security personnel to manage said plurality of service accounts, including:
establishing a secure identity for each application; and
granting authorization to said application to use said service account.

2. The non-transitory computer-readable medium according to claim 1, wherein said instructions for determining that said application is authorized to use said service account comprises instructions for verifying that said identification is approved for said application.

3. The non-transitory computer-readable medium according to claim 2, wherein the instructions for said verifying and said determining are performed using a restricted-access infrastructure.

4. The non-transitory computer-readable medium according to claim 3, wherein the computer-readable instructions further comprise instructions for setting said identification on a restricted-access variable in said restricted-access infrastructure in response to said determining that said identification is approved for said application.

5. The non-transitory computer-readable medium according to claim 1, wherein said service accounts allow access to one or more of the following enterprise resources: a financial information database, an employee information database, and a product inventory database.

6. The non-transitory computer-readable medium according to claim 1, wherein the computer-readable instructions further comprise instructions for returning said one or more credentials for said service account to said application in response to said determining that said application is authorized to use said service account.

7. The non-transitory computer-readable medium according to claim 6, wherein one or more of said credentials are changed according to a predefined schedule.

8. A non-transitory computer-readable medium having computer-readable instructions for establishing identifications for applications, said computer-readable instructions comprising instructions for:
receiving a request to let an application use a service account of a plurality of service accounts each including a number of resource credentials, said resource credentials including a service account identification, configuration information needed for the service account, and a resource password, said request including an identification for said application;
mapping said identification for said application to a file system path for said application;
storing said mapping of said identification to said file system path in a secure repository;
storing a number of notes related to the mapping, including time of the request, reason for the request, and who made the request;
determining, in response to receiving the request, whether said application is authorized to use the service account of the plurality of service accounts based on said identification for said application, wherein determining includes referencing:
a first database table including the plurality of service accounts and a respective number of resource credentials associated therewith, wherein said plurality of service accounts includes said service account; and
a second database table including applications that have been authorized to use at least one service account of said plurality of service accounts, wherein said plurality of service accounts includes said service account, said service account allowing access to a system resource within said enterprise application environment;
retrieving the number of resource credentials associated with said service account of the plurality of service accounts in response to determining that said application is authorized to use said service account of the plurality of service accounts
connecting, utilizing the retrieved number of resource credentials associated with said service account, said application to an appropriate resource; and
allowing service account owners and security personnel to manage said plurality of service accounts, including:
establishing a secure identity for each application; and
granting authorization to said application to use said service account of said plurality of service accounts.

9. The non-transitory computer-readable medium according to claim 8, wherein said computer-readable instructions further comprise instructions for using said mapping of said identification to said file system path to subsequently verify an identity of said application.

10. The non-transitory computer-readable medium according to claim 8, wherein said file system path is a code base for said application.

11. The non-transitory computer-readable medium according to claim 8, wherein said secure repository is a policy file that is accessible only to authorized personnel.

12. The non-transitory computer-readable medium according to claim 8, wherein said computer-readable instructions further comprise instructions for determining whether said application may be allowed to use said identification.

13. The non-transitory computer-readable medium according to claim 8, wherein said request is processed using a graphical user interface, said graphical user interface automatically putting said mapping of said identification to said file system path into a predefined format.

14. A non-transitory computer-readable medium storing instructions executable by a processing resource to cause a computer to:
receive a request from an application to use a service account of a plurality of service accounts each including a number of resource credentials, said resource credentials including a service account identification, configuration information needed for the service account, and a resource password, said request including an identification for said application;
determine, in response to receiving the request, whether said application is authorized to use said service account of the plurality of service accounts based on said identification for said application, wherein determining includes referencing:
a first database table including the plurality of service accounts and a respective number of resource credentials associated therewith, wherein said plurality of service accounts includes said service account; and
a second database table including applications that have been authorized to use at least one service account of said plurality of service accounts;
retrieve the number of resource credentials associated with the service account of the plurality of service accounts in response to determining that said application is authorized to use said service account of the plurality of service accounts;
connect, utilizing the retrieved number of resource credentials associated with the service account, said application to an appropriate resource;

cache one or more of the retrieved number of resource credentials of said service account; and allow service account owners and security personnel to manage said plurality of service accounts, including:
  to establish a secure identity for each application; and
  to grant authorization to said application to use said service account create a new service account for a corresponding resource within said enterprise;

store said new service account and a corresponding plurality of resource credentials in the first database table;

provide authorization to one or more applications within said enterprise to use said new service account to access said corresponding resource; and store an identification of said one or more applications and the corresponding authorization in the second database table.

15. The non-transitory computer-readable medium according to claim 14, including instructions executable by said processing resource to cause said computer to: add an identification of a newly authorized application to said second database table, and remove an identification for an application no longer authorized to use said service account from said second database table.

16. The non-transitory computer-readable medium according to claim 14, including instructions executable by said processing resource to cause said computer to store information regarding when said service account was most recently accessed in said service account database.

17. The non-transitory computer-readable medium according to claim 14, including instructions executable by said processing resource to cause said computer to encrypt one or more credentials for said service account in said first database table.

18. The non-transitory computer-readable medium according to claim 14, including instructions executable by said processing resource to cause said computer to search said first database table for said service account.

19. The non-transitory computer-readable medium according to claim 14, including instructions executable by said processing resource to cause said computer to perform one or more of the following: replace an existing service account with said new service account in said first database table, and convert an open-access service account in said first database table to an authorized-access service account in said first database table.

* * * * *